United States Patent [19]

Amesbury

[11] 4,357,082
[45] Nov. 2, 1982

[54] HIGH SPEED FILM ADVANCEMENT MECHANISM AND SYSTEM THEREFOR

[76] Inventor: Maurice G. Amesbury, 1106 E. Edna Pl., Covina, Calif. 91724

[21] Appl. No.: 220,525

[22] Filed: Dec. 29, 1980

[51] Int. Cl.³ .............................................. G03B 1/22
[52] U.S. Cl. ................................ 352/78 R; 352/191; 226/62; 226/70
[58] Field of Search ............... 352/191, 192, 193, 194, 352/130; 226/55, 56, 57, 58, 62, 70, 73

[56] References Cited

U.S. PATENT DOCUMENTS

| | | | |
|---|---|---|---|
| 2,986,316 | 5/1961 | Petersen | 226/57 |
| 3,081,013 | 3/1963 | Walther | 226/57 |
| 3,434,640 | 3/1969 | Coutant et al. | 226/62 |
| 3,587,960 | 6/1971 | Gerb | 226/62 |
| 3,599,850 | 8/1971 | Whitley | 226/57 |
| 3,618,837 | 11/1971 | Jacobsen | 226/57 |
| 3,771,862 | 11/1973 | Land et al. | 352/130 |
| 3,777,961 | 12/1973 | Blaschek | 226/57 |

Primary Examiner—L. T. Hix
Assistant Examiner—Alan Mathews
Attorney, Agent, or Firm—Roger A. Marrs

[57] ABSTRACT

A photographic system is disclosed herein having a film reel-to-reel cartridge insertably received into a camera having a high speed film advancement or transport mechanism and a projector adapted to immediately develop the film and project moving images onto a screen. The advancement mechanism includes a support plate for movably supporting a pair of elongated members substantially normal with respect to each other. Each member is movably mounted on the plate and their adjacent and opposing ends move in a substantially oval manner by respective or associated eccentric drives. One member includes a film opening registering pin while the other member includes a film drive claw. The eccentric drive times the pin and claw so as to properly advance the film through the camera between its supply and take-up reels.

3 Claims, 10 Drawing Figures

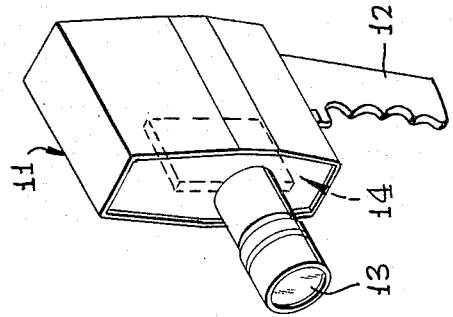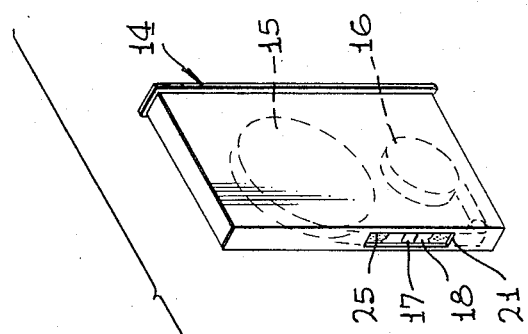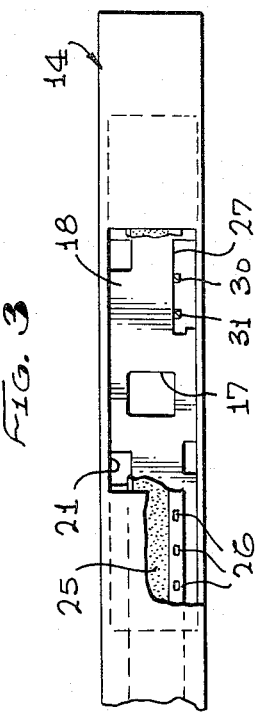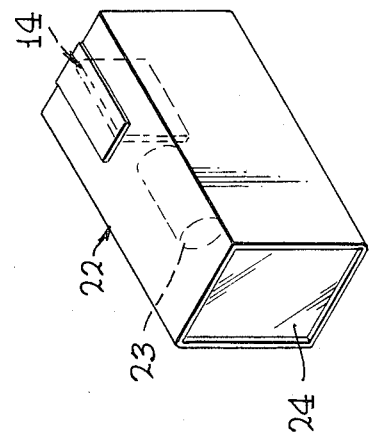

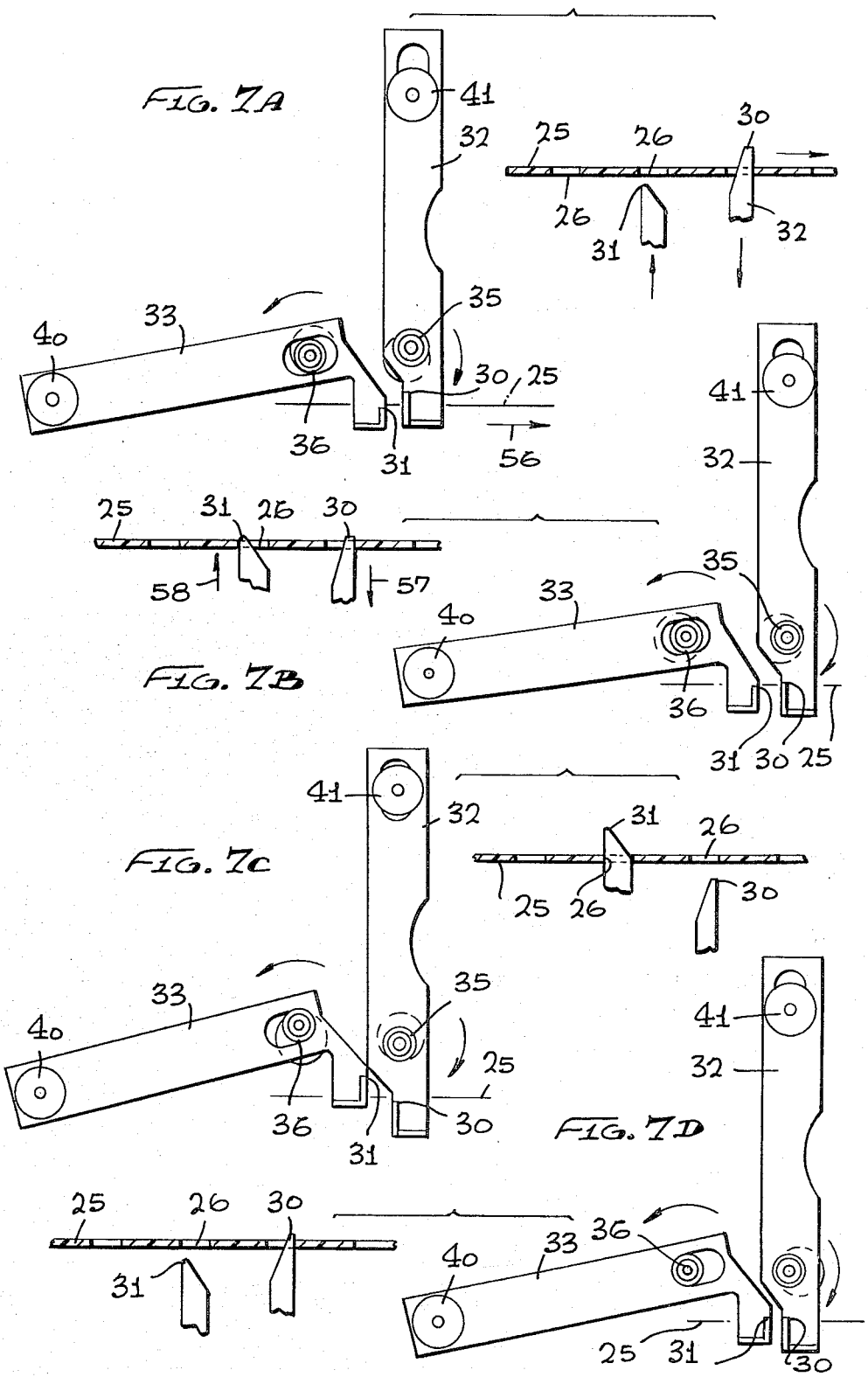

HIGH SPEED FILM ADVANCEMENT MECHANISM AND SYSTEM THEREFOR

BACKGROUND OF THE INVENTION

1. Field of the Invention

This invention relates to photographic systems and more particularly to a novel system incorporating a high-speed film advancement or transport mechanism capable of indexing with openings along the edge of the film and adapted to further engage with the openings for moving the film past a picture taking aperture.

2. Brief Description of the Prior Art

In modern photographic and film projection techniques, it has been the current practice to employ a film reel-to-reel cartridge which is placed into a hand or tri-pod camera for picture taking purposes. Normally, the camera motor drives the take-up reel in the cartridge so that the strip of film is passed via drive sprockets to a picture taking aperture permitting images to be exposed onto the film. Next, the exposed film cartridge is removed from the camera and placed into a projector where the film is instantly developed and ready for almost immediate showing by means of a suitable screen presentation. Chemicals for developing the film are included within the cartridge and activation of the chemicals on the film may be achieved via conventional techniques such as developed and commercially available by the Polaroid Company Cambridge, Mass.

Although the above described photographic system is suitable for home use, commercial use is somewhat limited due to the fact that the camera exposes the film at a rate of 18 frames per second. Such a rate is normal throughout the industry and exposes a sufficient number of frames so as to show a smooth and continued filming of moving objects. However, the viewing of the film taken at 18 frames per second does not provide nor permit detailed inspection of a particular moving sequence such as is often desirable when filming moving mechanisms in industrial applications. For example, problems often times arise during a machine operation when a cutting tool is operating on a work piece. When a conventional film advancement mechanism in a camera is employed so as to expose the film at a rate of 18 frames per second, insufficient detail is provided during the viewing for adequately inspecting and making a determination of tool cutting performance. However, if the speed of the film can be substantially increased, then the viewing of the same operation would occur in slow motion so that more adequate time for visual inspection is given to the cutting procedure in order to determine the adequacy thereof.

Again, it is extremely important in such industrial inspection and investigation procedures to take the moving pictures and immediately develop the film so that the moving pictures may be immediately projected for inspection purposes. Therefore, it is important that the film cartridge employed in such a photographic system be able to cooperate with the high-speed film advancement or transport mechanism located in the camera.

In view of the foregoing, it can be seen that a long-standing need has existed to provide a photographic system wherein a camera is employed to take high-speed motion pictures for instant development followed by immediate projection which includes means for excepting the film in a cartridge and means for advancing the film through the cartridge without binding or destroying the film or its attachments to the reels. Also, it is of great significance to provide such an advancement or transport mechanism which will readily cooperate with the film carrying cartridge so that all equipment such as the film cartridge, camera and projector will operate in a coordinated and compatable manner.

SUMMARY OF THE INVENTION

Accordingly, the above problems and difficulties are obviated by the present invention which provides a novel photographic system including a camera for accepting a film cartridge and a projector for projecting the images on the film from the cartridge after it has been removed from the camera and the film processed automatically and internally. The system includes a film cartridge having a film backup plate with an opening for receiving the terminating ends of an indexing pin and a claw pin carried on a high-speed film advancement or transport means operably mounted in the camera. The latter means includes a support plate for movably mounting an elongated register or index pin member and a claw member for driving the film. Eccentric means are provided for moving the index member and claw member in a prescribed time sequence whereby the index member causes its terminating pin to project in registry with an opening in the film and operably moving the claw member so that its terminating end will enter a film opening for engaging therewith and driving the film for a distance equivalent to a stroke of the drive member. Means are employed for driving eccentric members so as to effectively engage with each of the respective index and claw members so as to provide the necessary insertion and separation of the respective terminating pin ends of the members with openings of the film. The opposite ends of the members are pivotally mounted on the support plate and the members are located normal to each other at approximately 90° so that the respective index pin end and claw pin end are spaced from each other.

Therefore, it is among the primary object of the present invention to provide a novel photographic system capable of employing a conventional reel-to-reel film cartridge in a camera whereby the film is moved at a high rate of speed substantially in the range of 300 frames per second so that neither the film nor the supply or take up reels are damaged.

Still a further object of the present invention is to provide a novel film advancement or transport means wherein the film is moved at a substantial high rate of speed in up to 400 frames per second including an index means and a film drive means which cooperate together to register and drive the film past an image aperture.

Another object of the present invention is to provide a novel high-speed film transportation mechanism adapted to register with each frame of film and for moving a strip of film past an image or aperture window at a high rate of speed.

A further object of the present invention is to provide a novel photographic system employing a camera, a reel-to-reel film cartridge and a projector wherein the film is moved at high-speed in the camera, automatically processed and available for substantially immediate viewing in the projector.

Still a further object of the present invention is to provide a novel high speed film advancement or transport means wherein a registration or index means momentarily engages and holds a strip of moving film while a drive means engages and advances the film when the registration means has been momentarily withdrawn.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIG. 1 is a perspective view of a novel photographic system employing a camera having a high speed film advancement or transport mechanism employing the present invention;

FIG. 3 is a cross-sectional view of the film cartridge illustrating the film engaged by the advancement mechanism as taken in the direction of arrows 3—3 of FIG. 2;

FIGS. 7A-7D illustrate a complete working cycle of the film advancement or transport mechanism illustrating at least four strokes in the cycle sequence.

DESCRIPTION OF PREFERRED EMBODIMENT

Figure 2:
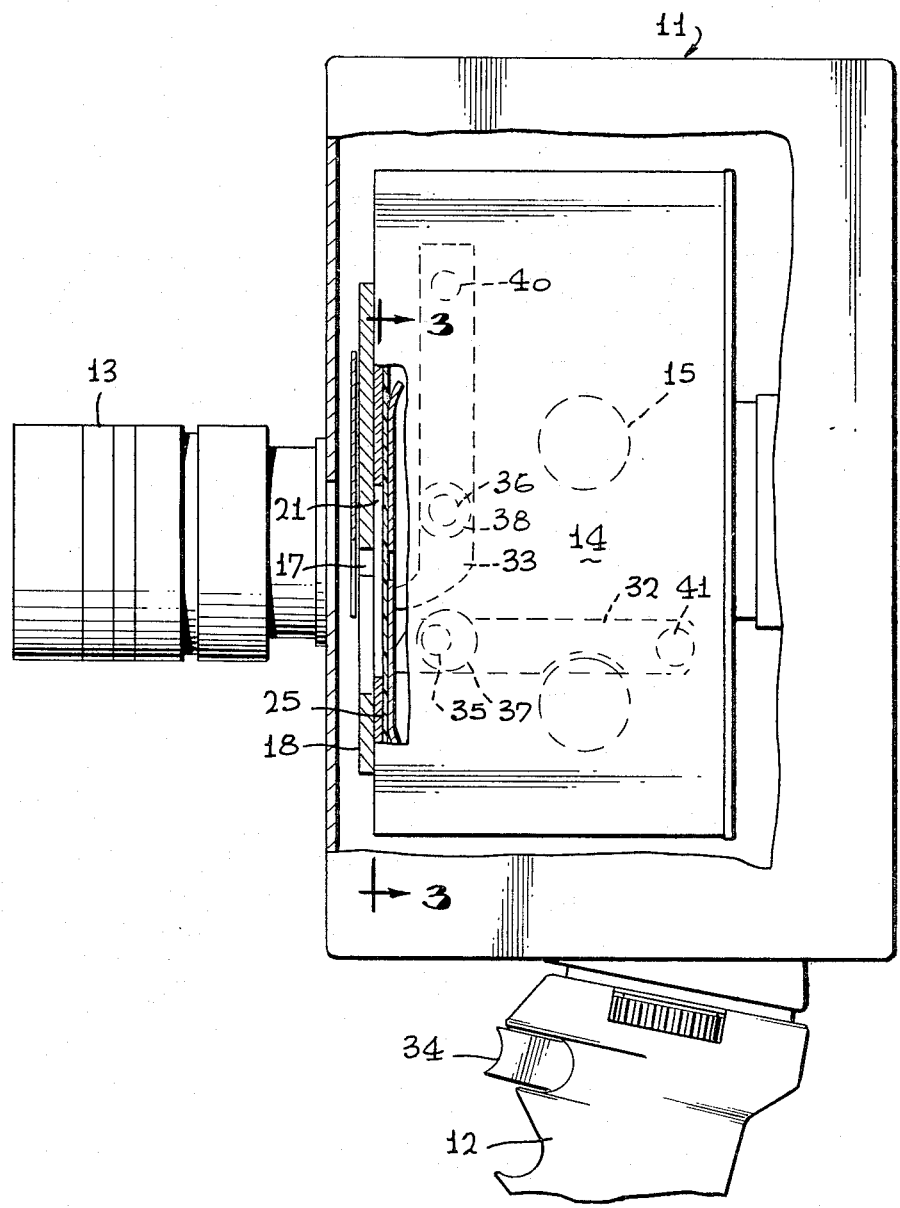
FIG. 2 is a side-elevational view of the camera shown in FIG. 1 having the side panel partially removed to expose the film advancement or transport mechanism illustrated in section.

Referring to FIG. 1, the novel photographic system of the present invention is shown in the general direction of arrow 10 which includes a camera 11 having a handle 12 intended to be grasped by the hand of the user and a lens 13 which may be selectively adjusted. The camera 11 is intended to insertably receive a film cartridge 14 which is illustrated in broken lines inside the camera. More clearly, the cartridge 14 illustrated in an enlarged view in solid lines wherein it can be seen that the cartridge includes a supply reel 15 for holding a quantity of strip film and a take-up reel 16 upon which the film strip is wound. Between the two reels, there is provided a film projection aperture 17 which is formed in a film support plate 18 over which the strip of film, as indicated by numeral 25 is drawn. The side of the cartridge 14 against which the film strip passes is provided with an elongated slot or opening 21 for exposing the window or aperture support plate 18. The camera 11 includes a drive means for engaging with the reels for powering the take-up reel 16.

The photographic system of the present invention further includes a projector 22 which insertably receives the cartridge 14 after the film therein has been exposed when the cartridge was previously in the camera 11. The cartridge 14 includes chemicals which automatically develop the film within the cartridge so that removal of the film from the cartridge is not necessary and so that film processing external of the cartridge is unnecessary. The projector 22 is of conventional design as is the cartridge 14. Both of these items are available from the Polaroid Company, Rockchester N.Y. The projector 22 includes a lens system 23 and a screen 24 adapted for rear screen projection purposes.

Referring to FIG. 3, the cartridge 14 is partially illustrated in an enlarged configuration wherein the strip of film is indicated by numeral 25 which includes a series or plurality of spaced apart holes or openings such as indicated by numeral 26. The holes 26 are employed for engagement by the novel film advancement or transport mechanism of the present invention. The latter mechanism moves the film past the window 17 so that images are projected directly on a screen after exposure in the camera. The film is guided or moved along the frontside of the support plate 18 through the slot 21. It is to be particularly noted in this view that the plate 18 includes a cutout or recessed portion 27 which exposes the edge marginal region of film 25 carrying the holes 26.

The film advance mechanism, to be described later in more detail, includes a film claw having a terminating end 30 for moving the film past the aperture 17 and an index pin terminating in pin 31.

Referring now in detail to FIG. 2, it can be seen that the cartridge 14 is inserted into a cavity in the housing of camera 11 so that the film support plate aperture 17 lies on the optical axis of the photographic system. The film 25 is drawn over the support plate 18 and past the aperture 17 when advanced by a drive claw or member 32 illustrated in broken lines. Cooperating with the film claw or member 32 is an index or register member 33. The terminating end of the drive or film claw 30 is attached to the member 32 while the register pin is carried on the extreme end of the register member 33. A conventional trigger mechanism indicated in general by numeral 34 is employed or energizing the camera motor when depressed. The drive motor (not shown) is operably connected to the register member 33 and the drive or film claw 32 so that a substantially circular movement is achieved for the extreme ends 30 and a rectilinear motion for end 31 of the respective members. This movement is achieved by means of eccentrics 35 and 36 carried on rotating discs 37 and 38 respectively. The eccentrics 35 and 36 are attached to one end of the respective members 32 and 33 respectively while the opposite end of the members are movably attached to supporting structure of the camera by pivots 40 and 41 respectively.

Figure 4:
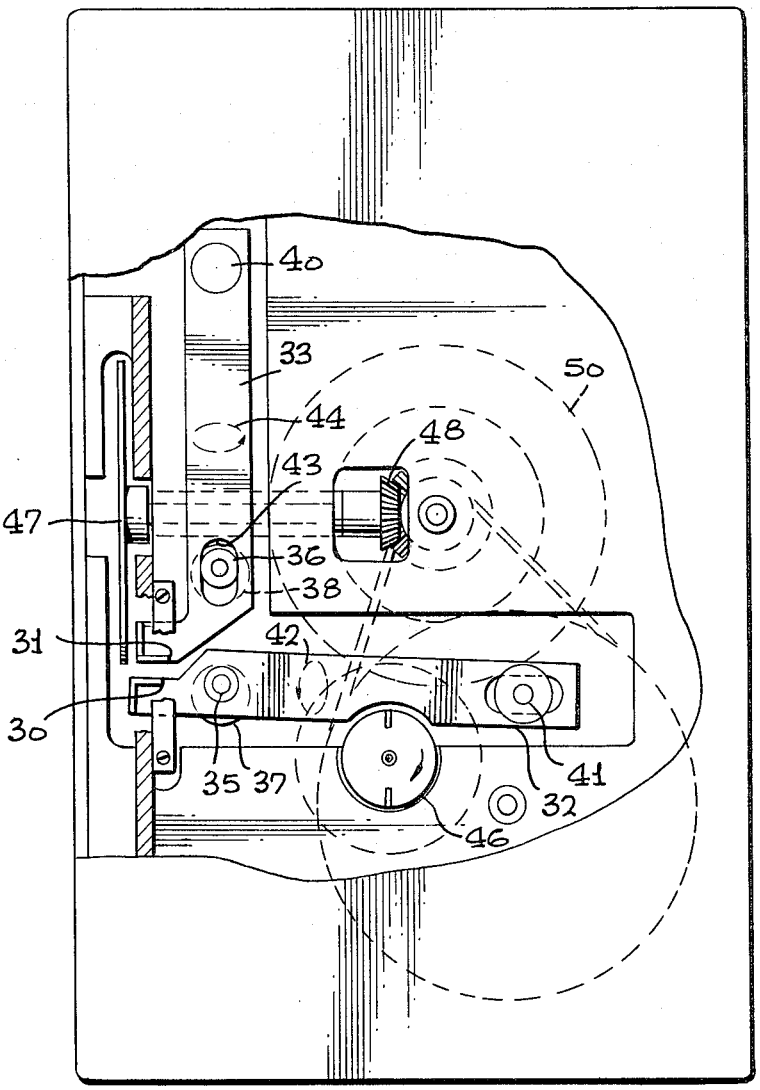
FIG. 4 is a view similar to the view of FIG. 2 illustrating the film advancement of transport mechanism in solid lines and further including a drive means therefore.

Referring now in detail to FIG. 4, it can be seen that the extreme end of the members 32 and 33 terminate in the respective pins 30 and 31 which engage with the holes along the edge marginal region of the film strip. By rotating the eccentric 35, the claw pin 30 carried on the claw or drive member 32 rotates in a substantially oval pattern or path as indicated by the arrow 42 upon rotation of the eccentric 36 which moves within a slot 43 in the member 33, the pin end for registering and indexing identified by numeral 31 moves in path indicated by arrow 44. The drive means for operating the eccentrics as well as other components of the camera are illustrated in broken lines. The take-up reel of the cartridge 14 is directly driven by the wheel 46 while a shutter 47 is driven via the engaged bevel gears 48. The main drive gear which is directly driven by the motor is indicated by numeral 50. The main drive gear engages with spur gears for driving the eccentrics 35 and 36 respectively.

Figure 5:
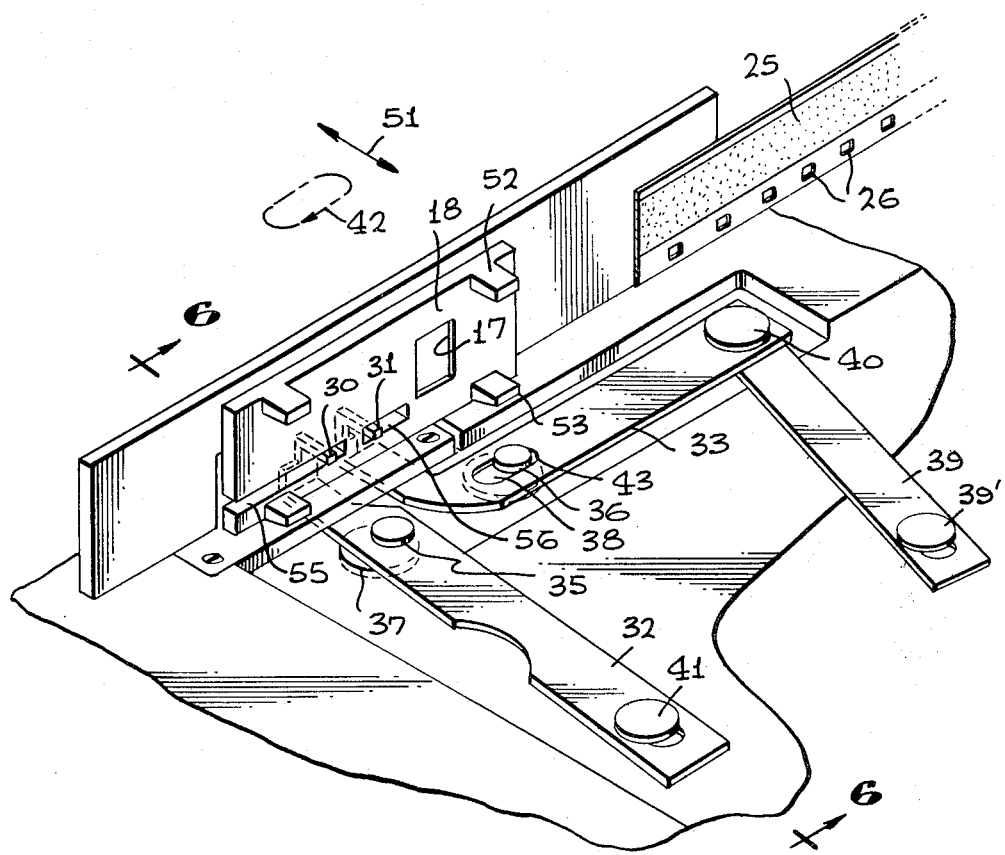
FIG. 5 is an enlarged perspective view of the film advancement or transport mechanism.

Referring now in detail to FIG. 5, it can be seen that the pin end 30 of the drive claw member 32 moves in an oval path 42 while the pin end 31 of the registry or index member 33 moves in a linear manner as indicated by the double arrows 51. The stroke and position of the index or register pin 31 establishes the timing relationship so that the film may be driven at the proper speed without causing damage. Since the end 31 is used for registering or index purposes only, the pin merely is inserted into the hole 26 of the film strip 25 and holds the film while the pin 30 of the drive claw member 32 moves into a notch where it engages with the film and as it drives the film in an advancement movement, the index pin is withdrawn.

Figure 6:
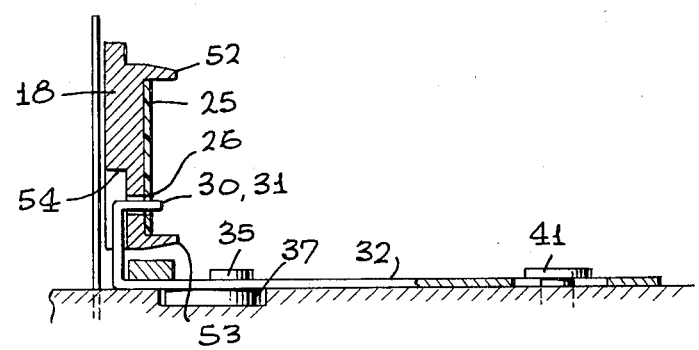
FIG. 6 is a transverse cross-sectional view of the film advancement or transport mechanism shown in FIG. 5 that is taken in the direction of arrows 6—6 thereof.

In FIG. 6, it can be seen that the pins 30 and 31 project into an associated notch or hole 26 at a prescribed time in its cycle sequence. The film strip is supported by the pressure backing plate which includes upper and lower guides 52 and 53 respectively. In both FIGS. 5 and 6, it can be seen that the film claw member 32 and the index or register member 33 include arms at adjacent ends which extend parallel with each other under the film and film support plate 18 and which extend upward into the aperture or recess 54 where the extreme ends of each member are folded over so as to extend backward over each arm of the respective member through slots 55 and 56 respectively. Therefore, it can be seen that the major length of the members 32 and 33 are pivoted normal with respect to one another and that the respective arms carried on each end of the members extend parallel with one another under the film and plate and then back through the slots 55 and 56 to terminate in the ends or pins 30 and 31 respectively. These pins or ends operably move in and out of the holes 26 of the film strip 25 in a timed sequence. One sequence or cycle of operation includes the placement of the register or index pin 31 into a slot followed by entrance of the film claw pin 30 which is subsequently withdrawn and insertion of the pin 31 takes place. At all times, either one or the other is in engagement with the film strip. Not only do the pins 30 and 31 move in and out of the respective holes 26 in the film strip, but the claw pin 30 moves in an oval path so as to engage one side of the hole 36 to drive or move the film in its advanced direction. Such movements are in accordance with the numerals 42 and 51 shown in FIG. 5.

Referring to FIGS. 7A through D, an operating sequence is illustrated showing the register pin 31 and the claw pin 30 operating to advance the film 25 in the direction of arrow 56. In FIG. 7A, the index pin 31 is clear of the hole 26 in the film 25 and the film claw pin 30 is fully extended through its associated hole in the film for advancement. In the next sequence is shown in FIG. 7B, the index pin 31 is advanced into the second hole behind the hole engaged by the claw pin 30. The claw pin 30 is moving in the direction of arrow 57 while arrow 58 indicates upward movement of the index pin into its associated film hole. In the next sequence as shown in FIG. 7C, the claw pin 30 is fully pulled down and extracted from the associated hole in the film and the sequence is complete. At this time, the index or register pin 31 is fully inserted into its associated hole. In FIG. 7D, the pin 31 is withdrawn and the claw pin 30 advanced into the next aperture or hole and in the next sequence, the movement is arrested as shown in FIG. 7A.

The register or index pin 30 is necessary due to the high-speed because of the film inertia developed during its movement by the film claw pin 31. The stroke may be adjusted by positioning of the pivot pin 40 which changes the timing of the index pin with respect to the claw pin. This is achieved by set screw positioning of arm 39 on its pivot 39'.

Therefore, it can be seen from the foregoing that the novel high-speed film advancement mechanism of the present invention provides a novel means for advancing a film strip past the aperture and shutter mechanism of a camera. The advancement mechanism basically includes moving members having pins adjacent to one another which rotate by means of eccentric movers so as to provide a timing stroke between a registering pin and a claw pin. Damage which may be caused by the inertia of the film as it advances at high-speed is prevented by the registering pin which enters the hole or opening along the edge of the film and permits the advancement claw pin to enter another hole for advancement purposes when the index or register pin has been extracted.

Furthermore, the present invention provides a novel photographic system wherein the exposed film in a cartridge may be immediately developed and shown in a projector. By virtue of recess 27 formed on the plate 18, the pins 30 and 31 can advance the film at high-speed. Therefore, the present invention includes a system incorporating the camera, the cartridge having plate 18 with recess 27 and the viewing projector 22.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. A high speed film advancement mechanism comprising the combination of:
   a support plate;
   a pair of elongated members movably carried on said support plate substantially normal with respect to each other;
   means carried on said support plate operably connected to said pair of members for driving the adjacent and opposing ends of said members in a substantially linear manner;
   a selected one of said pair of members having an index pin on its end for registration with holes in the film while the other one of said pair of members has a claw thereon for advancing the film subsequent to registration by said selected member;
   said drive means includes an eccentric drive for each of said members, and said eccentric drive means moves said index pin and said claw in a prescribed timed sequence whereby said index pin registers with the film opening and said claw will enter on adjacent film opening to drive the film for a distance equivalent to a stroke of said other member of said pair;
   drive means for driving said eccentric means so as to effectively engage with each of said respective index and claw members so as to provide the necessary inseration and separation of the respective index pin and said claw with openings of the film;
   said high speed film advancement mechanism is incorporated into a system having a film cartridge and a film backup plate over which a length of film travels;
   said film length having opening along at least one edge;

said backup plate having an opening over which said film openings travel;

said index pin in registration with said openings in said backup plate and said film edge; and said index pin and said claw are folded over upon their respective members so as to pass through said backup plate opening and then through said film opening.

2. The invention as defined in claim 1 wherein: said high speed film advancement mechanism mounted in a camera employed in a photographic system having a film reel-to-reel cartridge insertably received into said camera and a projector adapted to immediately develop said film and project images onto a screen.

3. The invention as defined in claim 1 wherein: said eccentric drive means moves said index pin and said claw in a linear configuration in plan view.

* * * * *